J. O. BIGHAM.
LISTER PLOW AND PLANTER.
APPLICATION FILED NOV. 21, 1912.
1,088,121.
Patented Feb. 24, 1914.
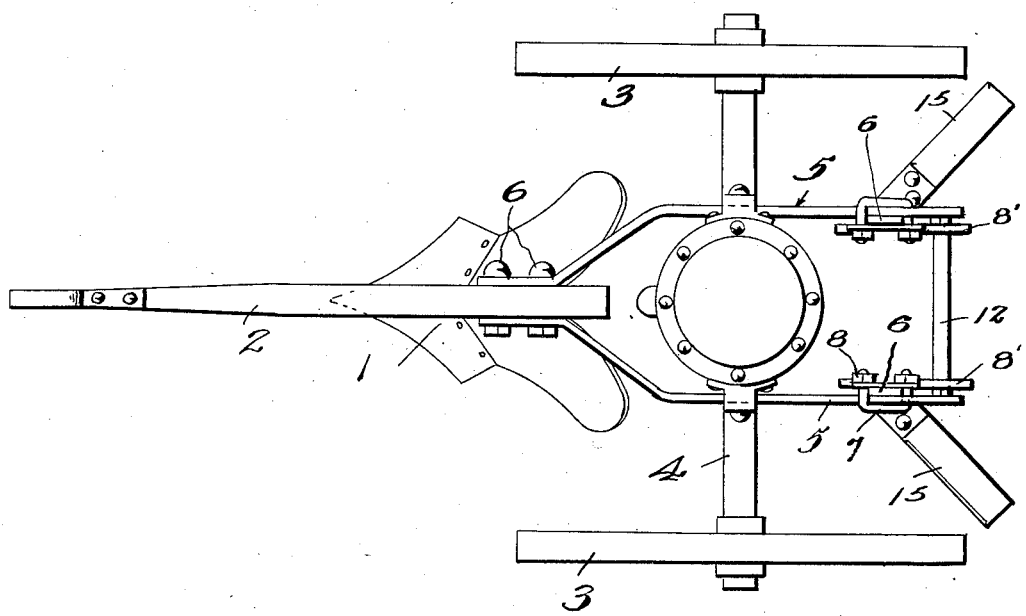
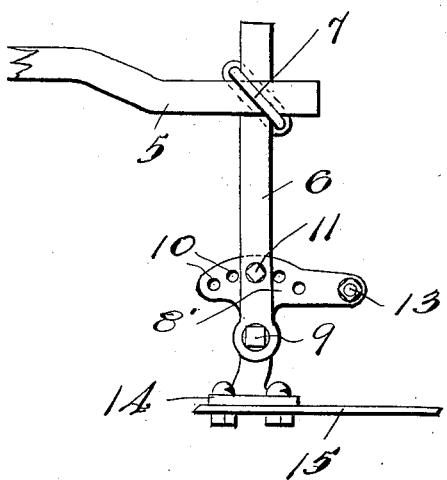
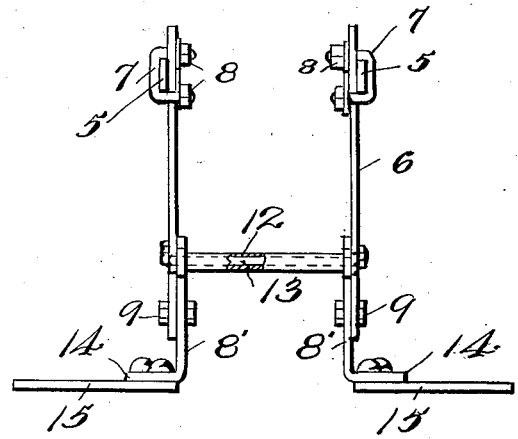
Witness
C. K. Davis
M. L. Newcomb
Inventor
J. O. Bigham
By Thomas R. Turner
Attorney
COLUMBIA PLANOGRAPH CO., WASHINGTON, D. C.

UNITED STATES PATENT OFFICE.

JAMES O. BIGHAM, OF BLYTHE, TEXAS.

LISTER PLOW AND PLANTER.

1,088,121.  Specification of Letters Patent.  Patented Feb. 24, 1914.

Application filed November 21, 1912. Serial No. 732,684.

*To all whom it may concern:*

Be it known that I, JAMES O. BIGHAM, a citizen of the United States, residing at Blythe, in the county of Gaines and State of Texas, have invented certain new and useful Improvements in Lister Plows and Planters, of which the following is a specification.

The present invention relates to improvements in lister plows and planters, and is designed especially to provide means in connection with the lister plow for cleaning the ground at the same time that the ground is plowed and the seed planted.

The object of the invention is the provision of a simple device which will be economical, efficient in operation, and one that may be applied with facility and detached from the implement without the expenditure of time or labor.

The invention consists essentially in a pair of blades, horizontally disposed, and adjustably attached to the frame of the implement, and extending out behind the wheels of the implement, away from the lister plow.

In the accompanying drawing I have illustrated one complete example of the physical embodiment of my invention constructed according to the best mode I have so far devised for the practical application of the principles.

Figure 1 is a plan view of the standard type of lister plow and planter having my invention applied thereto; Fig. 2 is a rear view of the two cutting blades of my device; Fig. 3 is a side elevation of the rear portion of the implement.

In the drawings I have illustrated my device as applied to a lister plow and planter of standard type. The plow 1 is supported from the beam 2 as usual, and the implement is carried on the wheels 3 and axle 4. A frame comprising parallel arms 5 is supported from the beam 2 by means of the bolts 6, and this frame which is located between the wheels 3 projects to the rear of the implement. Attached at the rear ends of the bars 5, one on each side of the frame, is a covering foot bar 6 which is secured by means of the U-shaped bolt 7 and nuts 8 to the side bars 5. These vertical bars 6, have attached at their lower ends a bracket 8', and a bolt 9 which passes through the bracket 8' and bar 6, may be used a pivot to adjust the relationship of the bracket 8' to the bar 6. For this purpose the bracket 8 is perforated as at 10 for the reception of a bolt 11 which passes through the perforations 10 and a corresponding hole in the bar 6. By this means it will be seen that the bracket 8' may be swung on the bolt 9 as a pivot and the bolt 11 may be used to hold the bracket in adjusted position.

The two brackets 8' are connected by a bolt 12 which is incased within a pipe or sleeve 13 that serves to hold the brackets and the bars 6 apart. Attached to the lower flange 14 of each bracket 8' is a cutting blade 15, and it will be seen that these blades project from the center of the implement obliquely outward toward the wheels 3, so that with these blades running behind the lister they cut through the ground and weeds that are growing in the ground and clean up, leaving the ground perfectly clean. By means of the adjustable brackets 8', the blades 15 may be set at any desired angle within limits.

By the utilization of my invention as herein applied, a farmer can go into his farm, even after the weeds have started to grow, and plant his ground with the plow and planter, and by means of the attached blades 15, he can at the same time clean the ground, thus accomplishing both planting and cleaning at the same operation.

From the above description taken in connection with my drawings, it will be apparent that I have provided a device which will accomplish the purposes set forth as the objects of my invention, in an economic, facile, and simple manner.

Having thus described my invention, what I claim as new, and desire to secure by Letters Patent, is:—

The combination with the horizontal side bars of a planter frame, of a pair of spaced parallel, vertical bars depending therefrom and adjustable thereon, a bracket pivoted at the lower end of each bar and provided with a curved series of perforations and a bolt whereby the bracket may be secured in adjusted position, a rearwardly projecting integral arm on each bracket, a space rod rigidly connecting the arms, and a horizontally disposed cutting blade rigidly attached to each bracket and extended outwardly from the rear of the frame.

In testimony whereof I affix my signature in presence of two witnesses.

JAMES O. BIGHAM.

Witnesses:
 CLYDE CORRON,
 L. C. SCOTT.